Jan. 25, 1966   F. E. RICE   3,230,653
VEHICLE LICENSE PLATE HOLDER
Filed Oct. 31, 1963
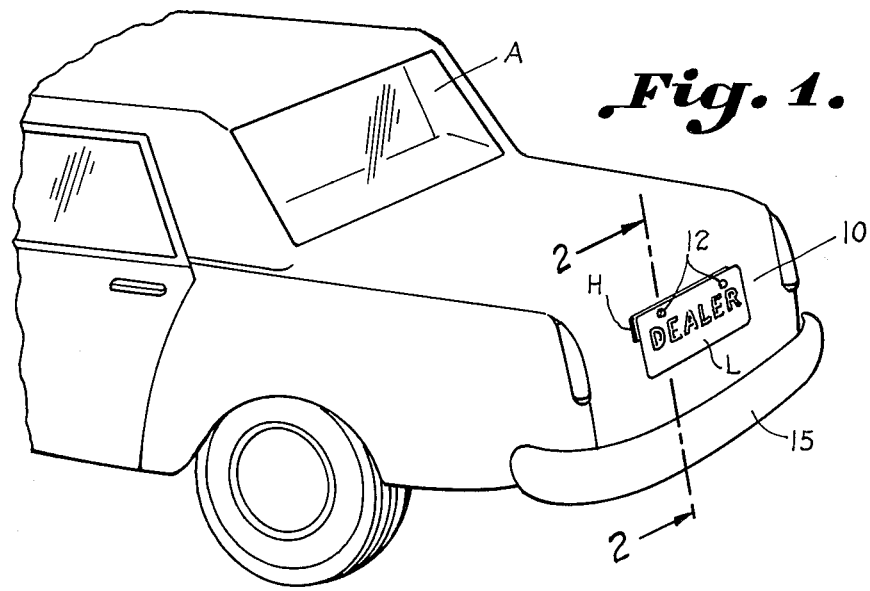
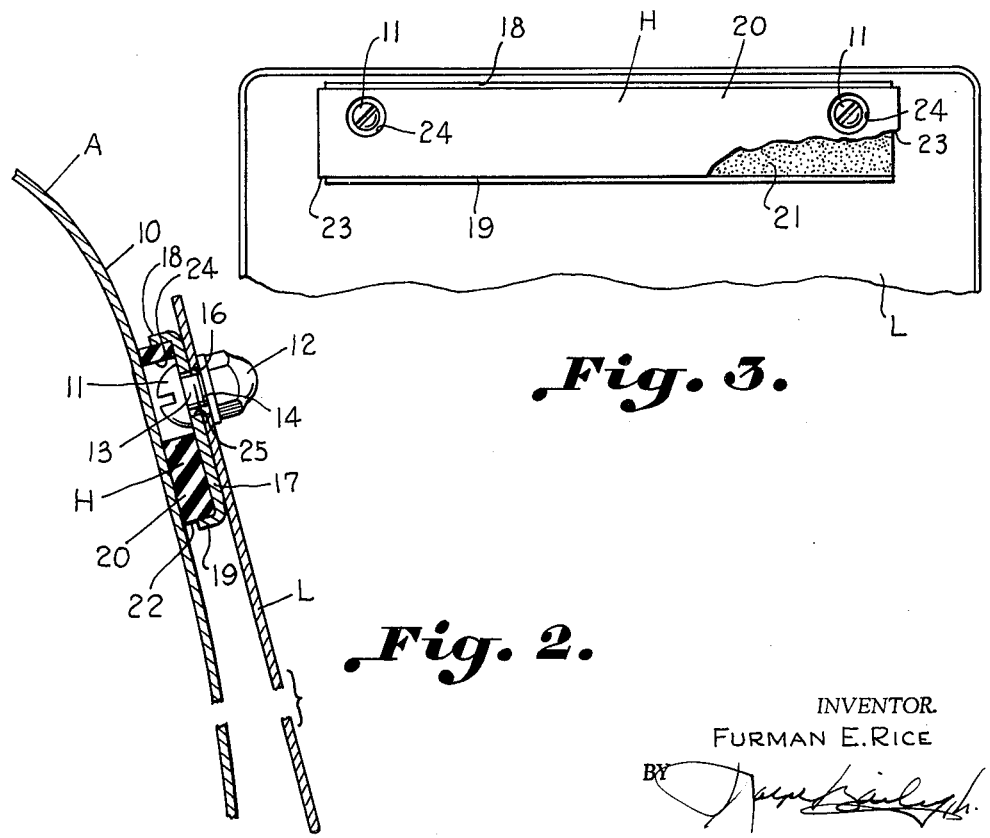
INVENTOR.
FURMAN E. RICE
BY 
ATTORNEY United States Patent Office 3,230,653
Patented Jan. 25, 1966

3,230,653
VEHICLE LICENSE PLATE HOLDER
Furman E. Rice, Greenville, S.C., assignor to Don Roddy, Inc., Greenville, S.C., a corporation of South Carolina
Filed Oct. 31, 1963, Ser. No. 320,368
1 Claim. (Cl. 40—129)

This invention relates to an improved vehicle license plate holder having particular application to use upon dealer license plates.

It has been common practice for automobile dealers to transfer their dealer license tags from one automobile to another by bolting and unbolting the fastening means on each transfer. It has heretofore, been impractical to use magnetic supports or holders because the usual tag brackets are too narrow to properly position the magnetic supports. It has also been impractical to construct a metallic magnet sufficiently large to effectively grip the painted or other surface of an automobile without marring such automobile surface. Efforts have been made to provide rubber coverings and the like for such magnets to prevent such marring, but such have been expensive and ineffective. Such magnetic supports simply blow off the vehicle during normal operation thereof. The present invention contemplates the use of flexible resilient permanent magnetic material such as that illustrated in United States Patent No. 2,959,832, issued November 15, 1960, in the name of M. Baermann. Devices constructed in accordance with the present invention afford an extensive rigid flat magnetic surface to effectively directly grip the surface of the automobile without marring such surface. While the invention is especially useful in connection with dealer tags it has other uses as well, such as with truck or regular vehicle tags of any type.

Accordingly, it is an important object of the present invention to provide an effective magnetic dealer license tag holder so as to avoid bolting and unbolting the fastening means on each transfer of the tags.

Another important object of the invention is to provide a magnetic license tag holder capable of effectively fastening a vehicle license tag to a vehicle without marring the surface of the vehicle.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view illustrating a vehicle license plate holder constructed in accordance with the present invention positioning a dealer license plate upon a painted surface of a vehicle, FIGURE 2 is an enlarged transverse sectional elevation taken on the line 2—2 in FIGURE 1, and FIGURE 3 is a rear elevation, at a reduced scale, of the device illustrated in FIGURE 2 removed from the vehicle.

Referring more particularly to the drawing an automobile is designated at A, having a painted surface 10. A dealer license tag L is illustrated as being attached to the painted surface 10 by a license plate holder H to which the license plate has been attached. The license plate L has been attached to the holder H by bolt type fastening means each including, enlarged portions in the form of a head 11 and a nut 12, and a shank 13 with a threaded portion 14 to receive the nut. If desired, the holder H could be positioned upon another surface of the automobile such as the outer surface of bumper 15. The license plate L has spaced apertures 16, only one of which is shown in FIGURE 2, for receiving the shank portion 13.

The license plate holder H includes an elongated unitary channel shaped bracket having a flat web 17 and flange portions 18 and 19. The bracket is constructed of rigid material preferably metal. A substantially rectangular flat elongated magnetic member 20 is constructed of flexible resilient permanent magnetic material. The magnetic member 20 is confined between the flange portions and is substantially coextensive with the inner surface of the web of the channel shaped bracket. A suitable glue 21 (FIGURE 3) may be used between the inner surfaces of the magnetic member and the web to insure the confining of the magnetic member 20 within the bracket. The magnetic member 20 projects outwardly beyond the free edges of the flange portions as illustrated at 22, and projects outwardly beyond the edges of the web as at 23. Thus, the outer surface of the magnetic member engages a surface of the vehicle. The magnetic member and the web each has spaced apertures 24 and 25, respectively (only one of which is shown in FIGURE 2), in register with each other and with the apertures 16 of the license plate for receiving the shank portions 13 of the fastening means. The apertures 24 of the magnetic member are larger than the apertures 25 of the web for receiving an enlarged portion 11 of the fastening means.

Thus, the license plate is secured to the web with the outer surface of the web engaging the inner surface of the license plate so that an enlarged portion of fastening means is received within the magnetic member so as to avoid contact of the vehicle surface therewith. When fastening the license plate to the holder the shanks of the fastening are received by the apertures within the license plate and the web. The web and the license plate are confined between the enlarged portions of the fastening means so that an extensive rigid flat magnetic surface directly grips the surface of the vehicle. Thus, the flat surface of the resilient magnetic member is rigidly supported and presented for substantially unbroken contact with the vehicle surface. It has been found in practice that such license plate holders, while easily attachable and transferable, do not become detached from the vehicle during normal use and do not mar the surface of the vehicle.

While a preferred embodiment of the invention has been described using specifice terms, such description is for illustrative purposes only, and it is to be understood that changes and variations may be made without departing from the spirit or scope of the following claim.

What is claimed is:

A holder for a vehicle license plate having spaced apertures for receiving the shank portion of fastening means each having enlarged portions including, an elongated unitary channel shaped bracket having a web portion and flange portions constructed of rigid metallic material, a substantially rectangular flat elongated magnetic member constructed of flexible resilient permanent magnetic material, said elongated magnetic member being confined between the flange portions and being substantially coextensive with the inner surface of the web of the channel shaped bracket, said magnetic member being of greater thickness than the depths of the flanges so that said magnetic member projects outwardly from said web beyond the free edges of the flange portions so that the outer surface thereof engages a surface of the vehicle, and said magnetic member and said web each having spaced apertures in register with each other, and with the apertures of the license plate for receiving the shank portions of the fastening means, the apertures of said magnetic member being larger than the apertures of said web for receiving an enlarged portion of the fastening means securing the license plate to the web with the outer surface of the web engaging the inner surface of the license plate so that an enlarged portion of the fastening means is received within the magnetic member so as to avoid contact of the vehicle surface therewith, the web and the license plate being confined between the enlarged portions of the fastening means, whereby an extensive rigid flat magnetic surface effectively directly grips the surface of the vehicle.

References Cited by the Examiner

UNITED STATES PATENTS

| | | | |
|---|---|---|---|
| 2,775,832 | 1/1957 | Vizza | 248—206 X |
| 2,957,261 | 10/1960 | Moskowitz | 248—206 X |
| 2,959,832 | 11/1960 | Baermann | 40—142 X |
| 2,964,812 | 12/1960 | Cook | 248—206 X |
| 2,977,082 | 3/1961 | Harris | 40—129 X |
| 3,064,330 | 11/1962 | Skidmore | 248—206 X |

WALTER A. SCHEEL, *Primary Examiner.*

JEROME SCHNALL, *Examiner.*